United States Patent [19]
Johansson et al.

[11] 3,871,782
[45] Mar. 18, 1975

[54] DEVICE FOR POSITIVELY RETAINING A BALL-SHAPED BEARING MEMBER IN A MATING BEARING SEAT

[75] Inventors: Roy Ingvar Mendel Johansson, Lilla Edet; Roy S. G. Lagerqvist, Akarp, both of Sweden

[73] Assignee: Volvo Flygmotor Aktiebolag, Trollhattan, Sweden

[22] Filed: Dec. 26, 1973

[21] Appl. No.: 427,598

[30] Foreign Application Priority Data
Dec. 22, 1972  Sweden............................ 16933/72

[52] U.S. Cl................................. 403/122, 403/353
[51] Int. Cl. ............................................. F16c 11/06
[58] Field of Search ............ 403/353, 122, 114, 76; 29/149.5 B; 91/507, 505

[56] References Cited
UNITED STATES PATENTS

| | | | |
|---|---|---|---|
| 1,775,712 | 9/1930 | Alvord............................ | 403/414 X |
| 3,002,466 | 10/1961 | Read................................ | 403/353 X |
| 3,192,868 | 7/1965 | Wahlmark ....................... | 403/122 X |
| 3,493,252 | 2/1970 | Watson et al...................... | 403/122 |

*Primary Examiner*—Andrew V. Kundrat
*Attorney, Agent, or Firm*—Pollock, Philpitt & Vande Sande

[57] ABSTRACT

In an axial piston machine with variable displacement, a device for positively retaining a piston rod universal ball joint, in a mating bearing seat formed in a driving disk for axial pistons. The bearing seat has a depth from its mouth plane greater than its radius, and is provided with a recess at its peripheral edge. The ball member is partly-spherical and has at the junction with the piston rod, a planar portion, the improvement being that the ball member at its spherical surface is provided with two diametrically opposite grooves lying with their center lines in a plane which intersects the center of said ball member and forms a small angle with a longitudinal center plane through said piston rod with ball member. The recess is disposed in the mouth plane and extends radially in relation to the axis of symmetry of the mouth, the recess having such a depth below said mouth plane and such a width as to at least substantially accomodate the piston rod portion adjacent the ball member temporarily during mounting and de-mounting of the ball member in the bearing seat.

1 Claim, 4 Drawing Figures

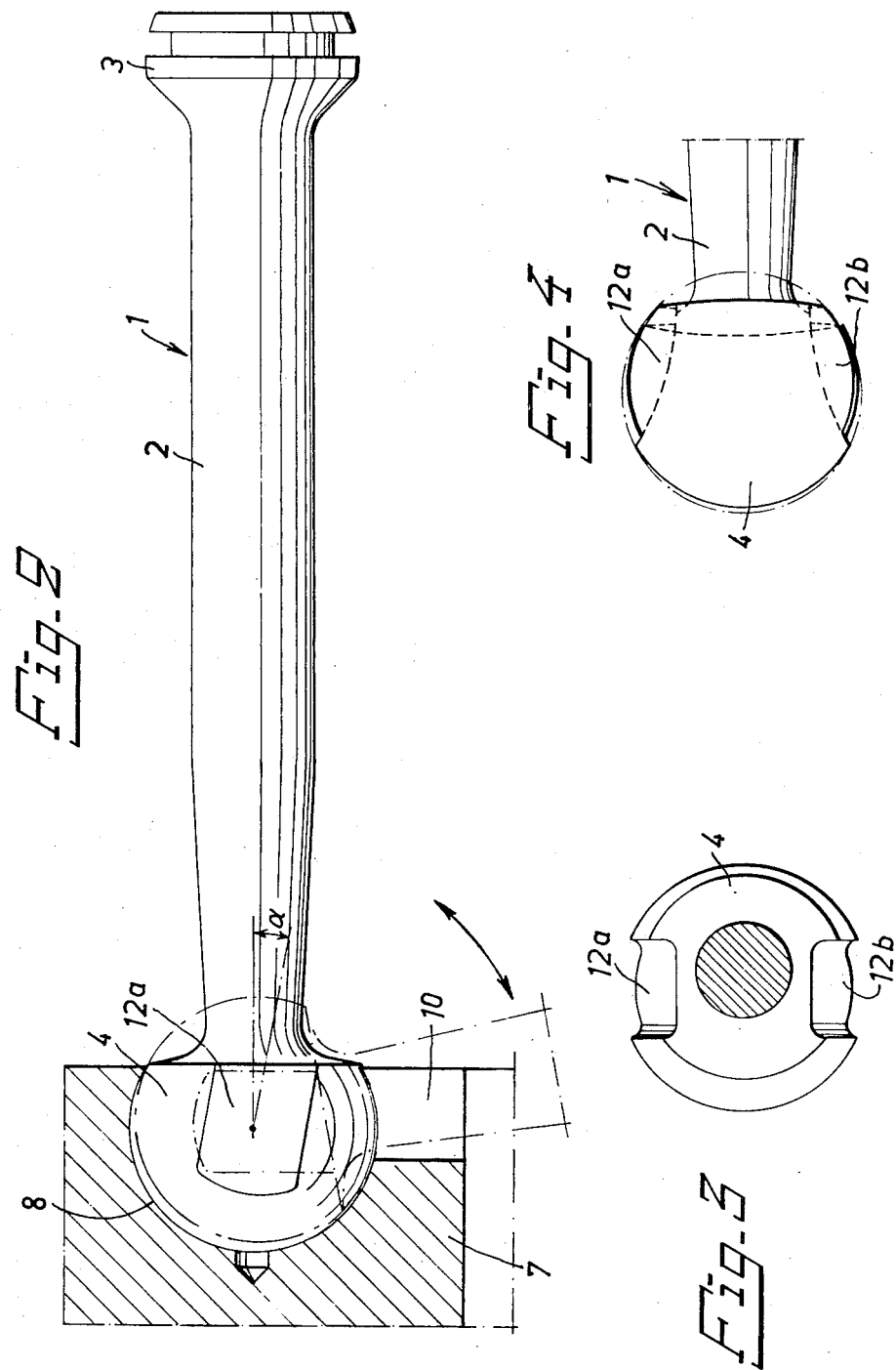

DEVICE FOR POSITIVELY RETAINING A BALL-SHAPED BEARING MEMBER IN A MATING BEARING SEAT

The present invention refers to a device for positively retaining or locating a generally spherical or ball-shaped bearing member, particularly a piston rod universal ball joint, in a mating bearing seat. Such a bearing seat may, in particular, be formed in a driving disk for axial pistons in an axial piston machine with variable displacement. The bearing seat has a depth from its mouth plane greater than its radius (i.e., the angle of embracement of said bearing seat around the ball member being greater than 180°). The bearing seat furthermore is recessed at its peripheral edge and the ball member is partly-spherical, having at the junction with the piston rod a planar portion.

BACKGROUND OF THE INVENTION

Bearing devices comprising a sphere or a ball in a more or less semi-spherical bearing seat are well known and many structures have been suggested for retaining the ball in the seat. Often the edge portion of the seat has become deformed or the seat mouth has been blocked in some other way, usually by means of separate parts, such as cover plates or rings adapted to be pressed in place. Common to these solutions of the retaining problem has been, however, that they have not been capable of resisting high loads and high rotational speeds and furthermore they have been relatively complicated.

Recently the ball-and-seat-assembly has been utilized for substantially more qualified and highly-loaded bearing applications and particularly this is the case in axial piston machines in which very high hydraulic pressure and rotational speeds are present. In such machines the bearing surface ought to be as great as possible nevertheless, at the same time, the weight of the bearing ought to be as low as possible and the number used in parts of the bearing should be at a minimum. Separate parts such as cover plates and similar are unsuitable since resiliences and clearances will be obtained therein at the high loads present. In an effort to overcome the above-mentioned problems particularly in connection with axial piston machines, there has been provided bearing having only a part-spherical bearing seat in the driving disk with an enbracement angle slightly exceeding 180°, while the ball has been provided with a stright cylindrical or similar surface with an axis coinciding with the axis of the piston rod. Certainly, said bearing operates satisfactorily for axial piston machines with constant displacement, although the bearing surface of the ball becomes rather much reduced due to said cylindrical surface. However, the ball can only be introduced into the bearing seat in a position with the piston rod at right angles to the driving disks, and in machines with variable displacement the ball will not be restrained from leaving the seat in this particular position which can be readily obtained during adjustment movements, and therefore said bearing design is unsuited for said variable machines.

Also, for the variable machines, a plurality of suggestions for positive retainment have been made, particularly in the form of various geometrical variations of the detailed shape of the ball and bearing seat or as separate locking parts (see, for example, U.S. Pat. NO. 3,192,868) but common to all these has been that they have been too expensive for practical production and/or reduced the required bearing surfaces too much.

In the U.S. Pat. No. 3,493,252 there has also been suggested a kind of positive retainment of a ball member (a part-sphere) in a part-spherical seat for a universal ball joint in lifting devices such as tractors. In said devices, the ball member has been provided with two recesses with progressively increasing depth, which define therebetween a rigid of the ball material, said ridge being adapted to be inserted into a mating recess in the spherical surface for "rolling" said ball member into the part-spherical seat. However, this suggestion cannot be utilized in the present case with a heavily-loaded ball-shaped member at the end of a piston rod in an axial piston machine operating with very high pressures, since too much of the required bearing surface of the ball member will be removed, particularly at unsuitable locations.

An axial piston in an axial piston machine operating with extremely high pressures of the magnitude of 150 bar or more is an extremely heavy-loaded structural element, the associated piston rod and piston ball of which requires thoroughly considered calculation to provide required strength and wear-resistance. This applies in even higher degree to axial piston machines with variable displacement. Actually, the assembly consisting of piston, piston rod and piston ball constitutes a qualified compromise between the many partly opposing requirements thereon. Thus, in a machine with variable displacement the piston rod must be capable of pivoting 43° or more in either direction from the vertical. The piston rod also must be given a certain minimum cross-sectional area at its intermediate portion so as to be able to resist the buckling forces. Since said forces decrease towards the ends of the piston rod the same can be made somewhat thinner at those locations, i.e., primarily the piston rod is made slightly tapered towards the piston rod ball. Even with high-strength special steels, the cross-sectional area of the piston rod will be so large that the mouth area of the seat necessary to permit pivotal movement of the piston rod approximately 43° to either direction from the vertical leaves at the mouth edge the minimum of material for retaining the balll taking into account the material characteristics and the great inertia forces which occur at the ends of the piston movement. For this reason, only the minimum possible removal of the material of the seat and ball can be allowed.

For dimensional and economical reasons, an axial piston machine is designed to be as small and compact as the choice of material and the structural conditions altogether allow, and as a consequence also the size of the bearing surfaces is close to the critical lower limit. Also, for this reason, it is essential that an embodiment of a positive retainment be provided which gives the minimum possible reduction of the available bearing surfaces.

In machines with variable displacement, the design must be such that the position of assembling the piston rod with its ball into the seat preferably differs as much as possible from the operating position and thus lies approximately 70°–80° from the vertical. Should it be deemed necessary to provide a radial groove at the seat edge similar to the structure disclosed in the above-stated U.S. Pat. No. 3,493,252, said groove must not be made too broad and must also not be disposed at an un-

SUMMARY OF THE INVENTION

Thus the primary object of the present invention is to provided an embodiment of a device of the kind referred to above, in which the ball member at its spherical surface is provided with two diametrically opposite grooves lying with their center lines in a plane, which intersects the center of said ball member and forms a small angle with a longitudinal center plane through said piston rod and the ball member. The grooves preferably are made by grinding, and the recess is disposed in the mouth plane and extends radially in relation to the axis of symmetry of said mouth, said recess having such a width as to at least substantially accomodating the piston rod portion adjacent the ball member temporarily during mounting and de-mounting of said ball member in the bearing seat.

By means of the present invention, there is now provided, in a very simple way, a cross-sectional plane of the piston ball which has a smaller area than all other similar planes through the center of the ball and which particularly has four points, namely the intersection points between the two grooves and the planar portion and the peripheral surface of the sphere, respectively, located on a circle, the radius of which is smaller than or equal to the radius of the mouth of the part-spherical bearing seat, so that the piston ball with this plane parallel to the mouth plane of the bearing seat can be introduced into the bearing seat but than immediately be retained therein by a small change of the inclined position of the piston. Thus, said positive location is effective and simultaneously very simple and easy to manufacture since it only requires a simple machining of the piston ball but without reducing the bearing surface to any essential extent. The mounting also becomes very fast and simple, and since no extra separate locking parts are present the weight is the lowest possible and all risks for clearances and resiliences to occur are excluded. An important advantage also it that the de-mounting becomes as simple, which differs from particularly the retaining devices in which separate parts or a deformation of the edge of the bearing seat is required for obtaining the retainment.

BRIEF DESCRIPTION OF THE DRAWINGS

By way of example, the invention will be further described below with reference to the accompanying drawing in which FIG. 2 is a view in enlarged scale of an axial piston of the machine according to FIG. 1 with the bearing seat for journalling the piston rod ball in section, FIG. 3 is a view of the piston rod ball as seen from the piston rod, the shape of the two opposite grooves being clearly seen, and FIG. 4 is a fragmentary elevational view of the piston rod end with the ball and its grooves according to FIG. 3 introduced in the mating bearing seat.

DETAILED DESCRIPTION OF THE PREFERRED EMBODIMENT

Figure 1:
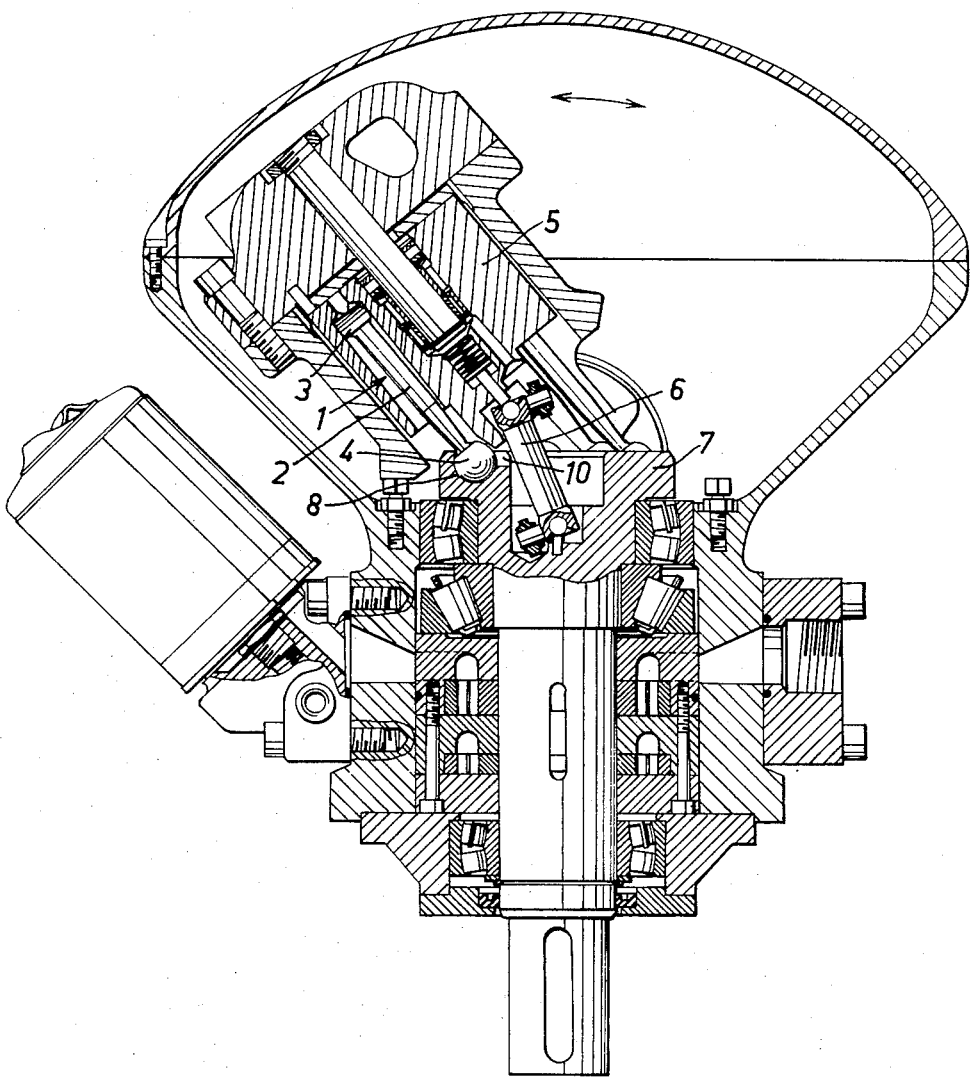
FIG. 1 is a sectional view of a variable axial piston machine in which a device according to the present invention can be advantageously applied.

In FIG. 1 of the drawing there is illustrated a sectional view through an axial piston machine with variable displacement, which is the kind of machine in which the present invention can most advantageously can be utilized. More particularly there is illustrated in FIG. 1 one of a plurality of axial piston assemblies 1 each comprising a piston rod 2 with a piston 3 formed at one end thereof and a bearing ball 4 formed at its opposite end. The piston 3 is slidably mounted in a cylinder of a cylinder barrel 5 which is adjustably connected with a driving disk 7 through a universal joint 6. The driving disk 7 is provided with bearing seats 8 for accomodating the respective bearing balls 4 of the axial piston assemblies 1. The bearing seat 8 has a depth below the mouth plane which is greater than the radius of the seat, i.e., the embracement angle of the bearing seat 8 around the ball-shaped bearing member 4 is greater than 180°.

Since the whole cylinder barrel 5 together with the piston assemblies 1 is adapted to be pivoted from one end position to another through an intermediate center position (one of the end positions being illustrated) so as to provide for adjustment of the displacement of the machine, it is essential that the bearing balls 4 in the bearing seat 8 be positively retained over at least more than the angular range of approximately ± 43° over which the cylinder barrel 5 is pivotable so as not to leave the bearing seats. To provide this feature according to the invention, firstly the bearing seat 8 at its mouth edge is provided with a radial recess 10 which may extend radially outwardly but which preferably extends inwardly as shown to avoid undersired loss of lubricant through the influence of the centrifugal force. The recess preferably has such a width and depth that it can accomodate at least substantially the portion of the piston rod 2 adjacent the ball member 4 temporarily during mounting and de-mounting of the pistons. Secondly, in order for the ball to be insertable into the bearing seat mouth which has a smaller diameter than the ball member 4, said ball member is provided with two opposite surface portions machined to reduced radial spacing from the center of the ball member, namely two grooves 12a, 12b, so that the ball member 4 in a certain sectional plane has a contour which can be inscribed in a circle with a radius smaller than or equal to the radius of the mouth of the bearing seat 8.

Because of the constructional characteristics of the ball and seat, the piston assembly 1 with its ball member 4 can be mounted into and de-mounted from the mating bearing seat 8 in the driving disk 7 by being oriented into a position where the piston rod 2 is approximately parallel to the mouth plane of the bearing seat 8 and with the portion of the piston rod 2 adjacent the ball member 4 inserted into the recess 10. As soon as the piston rod is raised from this position even a small angle with the ball member located in the bearing seat, the ball member will be retained therein very effectively. Since the piston rod in operation will never come close to this position of mounting and de-mounting, there are no risks at all that the ball member will be able to leave the bearing seat and the retainment will be absolutely reliable.

Preferably, the two opposite grooves 12a, 12b are made by a grinding operation of the ball member 4. The grooves 12a, 12b are to be given such a width and depth that a sufficient reduction of the diameter of the ball member 4 is obtained without detrimentally reducing the bearing surfaces. Suitably the grooves 12a, 12b are disposed with a small inclination α relative to the intended predetermined longitudinal centre sectional plane so as to compensate for the inability to place the axial piston assembly 1 into a completely horizontal position due to the radius of the piston 3. When inserting the ball member 4 into the bearing seat 8 through the opening of the latter which has a smaller diameter than the maximum diameter of the ball member, said ball member will be lowered, as is evident from FIG. 4, through said opening or mouth with its cross-section inscribable in the mouth circuit and will then be rotated as the axial assembly position is rotated upwardly from its nearly horizontal position toward its operating position.

Although the invention has been described and illustrated as applied particularly in the journalling of an axial piston assembly in a driving disk in connection with an axial piston machine, it is obvious to those skilled in the art that the present invention also can be applied in many other kinds of journals including a ball member and a mating bearing seat, as well as the fact that the invention also can be modified, particularly in view of its applications.

We claim:

1. In apparatus for positively retaining a generally spherically shaped bearing member at the end of a piston rod in a mating bearing seat and being of the type wherein the depth of the bearing seat from its mouth plane is greater than its radius so that the angle of embracement of the bearing seat about the bearing member exceeds 180°, the improvement comprising:

two diammetrically opposed grooves formed in the outer surface of said bearing member and so located that their respective center lines lie in a plane which intersects the center of said bearing member and forms a small angle with a plane also passing through said center and containing the axis of said rod, and a recess communicating with and extending radially from said bearing seat, said recess having a depth below the mouth plane of the bearing seat and sufficient width to receive temporarily at least a substantial portion of the piston rod at its end adjacent said bearing member during the assembly and disassembly of said bearing member and bearing seat, whereby said opposed grooves provide a predetermined sectional plane whose radius does not exceed the radius of the mouth of the bearing seat to thereby permit the bearing member to be readily inserted into said bearing seat while the bearing member and its associated piston rod are oriented so as to be almost parallel with the mouth plane but with said bearing member being positively retained in said bearing seat when the rod and bearing member are rotated to an operating position where a substantial angle is formed between said rod and said mouth plane.

* * * * *